United States Patent [19]
Heiberger

[11] 3,892,692
[45] July 1, 1975

[54] FLEXIBLE VINYL CHLORIDE-ETHYLENE COPOLYMER COMPOSITIONS

[75] Inventor: Charles A. Heiberger, Princeton, N.J.

[73] Assignee: Air Products and Chemicals, Inc., Allentown, Pa.

[22] Filed: May 13, 1974

[21] Appl. No.: 469,184

Related U.S. Application Data

[63] Continuation-in-part of Ser. No. 335,018, Feb. 23, 1973, abandoned, which is a continuation of Ser. No. 199,783, Nov. 17, 1971, abandoned.

[52] U.S. Cl. ... 260/23 XA; 260/18 EP; 260/30.6 R; 260/30.8 R; 260/31.2 R; 260/31.8 R; 260/31.8 B; 260/32.4; 260/32.6 R; 260/33.6 VA; 260/42.49
[51] Int. Cl. ... C08f 45/38; C08f 45/40; C08f 45/50
[58] Field of Search ......... 260/31.8 R, 30.6, 87.5 C, 260/31.8 B, 23 XA, 31.2 R

[56] References Cited
UNITED STATES PATENTS 3,468,840  9/1969  Heiberger et al. ............. 260/87.5 C
3,501,440  3/1970  Kamio et al. .................... 260/87.5 C
3,507,845  4/1970  Hornbaker ...................... 260/87.5 C
3,706,705  12/1972 Koyanagi et al. ............... 260/87.5 C
3,725,325  4/1973  Takeda et al. .................. 260/87.5 C

FOREIGN PATENTS OR APPLICATIONS 1,035,339  7/1966  United Kingdom ............ 260/87.5 C

*Primary Examiner*—James H. Derrington
*Attorney, Agent, or Firm*—Richard A. Dannells, Jr.; Barry Moyerman

[57] ABSTRACT

Flexible vinyl chloride-ethylene copolymer compositions having a low permanent modulus index substantially overcome plasticizer migration problems. The vinyl chloride-ethylene copolymers are internally plasticized and only small amounts of external plasticizer are required to obtain a flexible product. Even when low cost plasticizers containing 20 to 42 major atoms are utilized the resulting vinyl chloride-ethylene copolymer compositions exhibit a high degree of plasticizer permanence.

4 Claims, No Drawings

FLEXIBLE VINYL CHLORIDE-ETHYLENE COPOLYMER COMPOSITIONS

CROSS REFERENCE TO RELATED APPLICATIONS

This application is a continuation-in-part of application Ser. No. 335,018, filed Feb. 23, 1973, now abandoned which application is a continuation of application Ser. No. 199,783 filed Nov. 17, 1971, now abandoned.

FIELD OF THE INVENTION

The present invention relates to the preparation of flexible vinyl chloride-ethylene copolymer compositions which have a high degree of plasticizer permanence and, more particularly, the present invention relates to plasticized flexible vinyl chloride-ethylene copolymer compositions which have a permanent modulus index of less than about 3,000 pounds per square inch and which exhibit substantially reduced plasticizer migration characteristics.

BACKGROUND OF THE INVENTION

It has long been known that the physical properties of a polymeric solid can be influenced by the addition of organic liquids known as plasticizers. Plasticizers influence the secondary valences or van der Waals forces which act between polymer chains and the steric flexibility of individual chains which depend essentially on the structure of the polymer itself. The necessity for using plasticizers to obtain desired physical properties in a polymeric composition has led to repeated efforts to solve a major problem caused by plasticizer addition, viz., lack of plasticizer permanence. This particular problem has become more pronounced with the ever increasing use now being made of vinyl plastic compositions and the fact that applications for these vinyl plastic compositions have become more sophisticated. Several separate and distinct examples can be given to clarify what is basically one phenomenon—the mobility of plasticizer in polymeric materials.

In recent years vinyl coated fabric upholstery has been growing in popularity for use in automobiles—particularly as seating and as dashboard covers. However, when the temperature inside a closed, parked car becomes quite warm due to outside temperature conditions, volatiles, mostly plasticizers, leave the vinyl coated fabric upholstery. These volatiles often become condensed on the inside of the windshield, forming a difficult-to-remove, greasy type of haze or windshield fogging.

Another example of the mobility of plasticizers in polymers occurs in shower curtains and baby pants made from vinyl film. These vinyl materials become embrittled as the plasticizer migrates into soapy water.

Even though it is important that the integrity of the protective jacketing of circuit wiring in buildings be retained for many years, conductor temperatures have caused volatilization of plasticizer and over a period of years this has resulted in embrittlement of the protective covering of wiring.

Another example is present in the modern refrigerator in which the bezel surrounding the door opening is often made from a styrene polymer. The door gasket, which closes against this bezel, is typically a vinyl material. Unless the gasket material on the door is formulated properly, plasticizer migrates into the bezel causing it to become soft and sticky. Simultaneously, the resilience and effectiveness of the gasket material is reduced.

A very serious problem can also arise when migration occurs in containers designed to hold blood or food materials. Migration of plasticizer can cause toxic ingredients to be transmitted to blood plasma or food.

Each of the above examples represents a manifestation of the same basic problem—the tendency of plasticizer to migrate in plastic materials. In order to overcome this serious problem, emphasis has been placed on using plasticizers having larger, less mobil molecules. The permanence of a plasticizer, i.e., its tendency to remain in the plasticizer material, depends on the size of the plasticizer molecule and on its rate of diffusion in the polymer. The larger of the plasticizer molecule, the lower its vapor pressure, or volatility and, therefore, the greater its permanence. Other factors, such as polarity and hydrogen bonding, will also, of course, affect the vapor pressure of the plasticizer. It has been recognized that major atoms, such as carbon, oxygen, nitrogen, sulphur and phosphorus, add bulk and immobility to a molecule, whereas hydrogen contributes little in terms of bulk and immobility. To obtain acceptable permanence the industry has utilized polymeric plasticizers such as polyesters which have at least 50 or more major atoms, despite the relatively high price of such polyesters. In fact, for really good permanence it has been necessary to use plasticizers having more than 65 major atoms. Due to their viscosity, such plasticizers are often difficult to handle. When other desired properties for plasticized materials, such as heat and light stability, low glass transition temperature, low odor, and nontoxicity are considered, the problem of overcoming plasticizer migration becomes even more complex.

It has now been discovered that flexible vinyl chloride-ethylene copolymers containing a minimum amount of ethylene can be formulated using low cost, monomeric plasticizers while developing the plasticizer permanence usually associated with the more complex, expensive polymeric plasticizer materials. Such copolymers are distinguishable from a prior art vinyl chloride-ethylene copolymer containing substantially less than this minimum amount of ethylene; see Example 6 of Kamio et al., U.S. Pat. No. 3,501,440. This prior art copolymer results in a high level of plasticizer migration as evidenced in the Examples set forth below.

Accordingly, it is now possible to use vinyl chloride-ethylene copolymer compositions in applications which were previously believed to be precluded for such polymeric materials because of plasticizer migration.

SUMMARY OF THE INVENTION

An object of the present invention is to obtain improved plasticizer permanence in vinyl chloride-ethylene copolymers.

Another object of the present invention is to provide vinyl chloride-ethylene copolymers which are internally plasticized and which require the addition of only relatively small amounts of external plasticizer.

A further object of the present invention is to obtain flexible vinyl chloride-ethylene copolymer compositions having a permanent modulus index of less than about 3,000 pounds per square inch which have substantially reduced plasticizer migration characteristics.

Still a further object of the present invention is to provide flexible vinyl chloride-ethylene copolymer compositions of improved chemical and dimensional stability which have been plasticized with plasticizers having between about 20 and about 42 major atoms.

In accordance with the present invention, flexible vinyl chloride-ethylene copolymer compositions are prepared by blending between about 60 and about 85 weight percent of vinyl chloride-ethylene copolymer having an ethylene content of between about 10 and about 40 mole percent, an intrinsic viscosity of between about 0.5 and about 1.5 dl/g, a permanent modulus index of less than about 3,000 pounds per square inch at 23°C and a $T_4$ value above about 25°C, with between about 15 and about 40 weight percent of a compatible plasticizer. Advantageously, the plasticizer utilized is one containing between about 20 and about 42 major atoms.

DESCRIPTION OF THE PREFERRED EMBODIMENTS

According to ASTM D883, rigid resinous compositions are defined as plastic materials which have a stiffness or apparent modulus of elasticity greater than 100,000 pounds per square inch at 23°C, when determined in accordance with The Method of Test for Stiffness and Flexure of Plastics (ASTM D 747). In accordance with the same test, semi-regid plastic materials are defined as having a modulus of elasticity greater than 10,000 pounds per square inch at 23°C and flexible plastic materials are defined as having a modulus of elasticity less than 10,000 pounds per square inch at 23°C.

The flexible vinyl chloride-ethylene copolymer compositions of the present invention have a permanent modulus index (PMI) of less than about 3,000 pounds per square inch, said index being defined as the 100% tensile modulus of a composition containing 17 parts per hundred parts of copolymer of dioctyl phthalate plasticizer, which composition is substantially permanent with less than about 0.3 weight percent loss after 24 hours in hexane at 23°C. Ethylene acts as an internal plasticizer for the copolymer, replacing part of the external plasticizer required. This, in turn, reduces or eliminates problems associated with plasticizer migration, extraction and volatility. The internal plasticizing effect also permits the use of low cost monomeric plasticizers in place of expensive polyesters which have heretofore been required in order to obtain substantially the same degree of permanence.

It has heretofore been well recognized in the art that the rate and extent of plasticizer loss depends upon both the type and concentration of plasticizer, and that, for example, in the extraction of dioctyl phthalate (DOP) plasticizer by hexane, weight loss will occur until sufficient plasticizer is lost to increase the glass transition temperature ($T_g$) above the test temperature (23°C). Extraction ceases when the composition becomes glassy and rigid. Published references, including Mellan "The Behavior of Plasticizers" p. 84, 121–3, 146, 173–9 (Pergamon Press) and ACS Advances in Chemistry Series No. 48 "Plasticization and Plasticizer Processes" p. 7, 51–3, 56, 58–59, support this concept that permanence is dependent upon the rate of diffusion and that plastics above their $T_g$ temperature, i.e. in the rubbery state, contain plasticizers in a mobile state, readily diffusable and extractable (unless immobilized by their very high molecular weight). Contrary to this accepted mechanism, the plasticized vinyl chloride-ethylene copolymer compositions of this invention show substantially zero extraction at the low moduli corresponding to the rubbery state above their $T_g$ temperatures, even when plasticized by low molecular weight plasticizers such as DOP. Polyvinyl chloride homopolymer and copolymers including vinyl chloride-propylene and vinyl chloride-vinyl acetate do not give such a permanent modulus index below 3000 psi.

Specifically, the vinyl chloride-ethylene copolymer compositions of the present invention have an ethylene content of between about 10 and about 40 mole percent, an intrinsic viscosity of between about 0.5 and about 1.5 dl/g., a permanent modulus index of less than about 3,000 pounds per square inch measured at 23°C, and a $T_4$ value above about 25°C. Preferably the copolymers contain 15 to 30 mole percent ethylene and have an intrinsic viscosity of between about 0.9 and about 1.3 dl/g., a PMI of less than about 2,500 pounds per square inch and a $T_4$ value above about 40°C.

Between about 60 and about 85 weight percent of the vinyl chloride-ethylene copolymer is blended with between about 15 and about 40 weight percent of a compatible plasticizer to obtain the desired compositions. Preferably, between about 70 and about 85 weight percent of the vinyl chloride-ethylene copolymer is blended with between about 15 and about 30 weight percent of a compatible plasticizer. In certain applications, it is even more preferred that between about 80 and about 85 weight percent of the vinyl chloride-ethylene copolymer is blended with between about 15 and about 20 weight percent of a compatible plasticizer. Advantageously, plasticizers having between about 20 and about 42 major atoms are employed and preferably the plasticizers which are used have between about 24 and about 35 major atoms.

To achieve a permanent modulus index (PMI) below 3,000 pounds, the vinyl chloride-ethylene copolymers must contain a minimum of 10 mole % ethylene. Whereas there is no upper limit in ethylene content to meet this PMI parameter, there is an upper limit of 40 mole % ethylene to meet the requirement that the unplasticized resin have a $T_4$ (temperature at which the apparent modulus of elasticity is 10,000 pounds per square inch) value above about 25°C. Higher ethylene content copolymers have PMI values substantially below 1000 pounds per square inch (psi) and would require less than 15 parts of dioctyl phthalate per hundred parts of the copolymer composition to obtain 100% moduli in the useful range up to 3000 psi or higher. Low temperature flexibility, as measured by $T_f$ values on the plasticized compositions, would be inferior (higher $T_f$ values) to a lower ethylene content copolymer containing a higher level of dioctyl phthalate (DOP) or other plasticizer to achieve the desired 100% modulus. In any event, the ethylene content should be the minimum required to obtain a specified 100% modulus at the maximum plasticizer concentration to achieve the degree of permanence consistent with the end-use application. The following table shows the low temperature flexibility ($T_f$) at equal 100% tensile moduli:

| 100% Tensile Moduli, psi | Mole % Ethylene In Copolymer | % DOP | $T_f$, °C |
| --- | --- | --- | --- |
| 3000 | 0 | 24 | +5 |
|  | 10 | 15 | +21 |
|  | 14 | 9 | +30 |
|  | 21 | 0 | +40 |
| 2000 | 0 | 31 | −14 |
|  | 10 | 23 | 0 |
|  | 13 | 20 | +5 |
|  | 19 | 15 | +14 |
|  | 30 | 0 | +32 |
| 1500 | 0 | 35 | −24 |
|  | 10 | 29 | −14 |
|  | 13 | 26 | −10 |
|  | 20 | 20 | 0 |
|  | 25 | 15 | +8 |
|  | 36 | 0 | +26 |
| 1000 | 0 | 41 | −36 |
|  | 10 | 35 | −30 |
|  | 20 | 29 | −21 |
|  | 30 | 20 | −8 |
|  | 35 | 15 | 0 |
|  | 47 | 0 | +20 |
| 800 | 0 | 44 | −41 |
|  | 10 | 39 | −35 |
|  | 25 | 29 | −23 |
|  | 35 | 20 | −11 |
|  | 40 | 15 | −4 |
|  | 52 | 0 | +16 |

Specific copolymer compositions are set forth in the following table:

| Copolymer | Mole % Ethylene | Intrinsic Viscosity | $T_4$, °C | PMI, psi |
| --- | --- | --- | --- | --- |
| A | 10 | 1.02 | 73 | 3000 |
| B | 12.5 | 1.42 | 65 | 2750 |
| C | 14 | 1.15 | 62.5 | 2600 |
| D | 15 | 1.25 | 61 | 2540 |
| E | 17.5 | 0.93 | 58.5 | 2300 |
| F | 19 | 1.35 | 56 | 2250 |
| G | 19 | 0.76 | 54 | 2250 |
| H | 19.5 | 1.02 | 54 | 2150 |
| I | 20 | 0.85 | 53 | 2050 |
| J | 21.5 | 1.19 | 50.5 | 1775 |
| K | 23 | 0.85 | 47.5 | 1675 |
| L | 25 | 1.05 | 46 | 1500 |
| M | 25 | 0.57 | 44 | 1450 |
| N | 28 | 0.67 | 41.5 | 1250 |
| O | 29 | 1.05 | 42 | 1150 |
| P | 38 | 0.90 | 29 | 900 |

Intrinsic viscosity values referred to herein are expressed in dl/g., and are determined in conventional manner by an extrapolation to infinite dilution of the reduced viscosity values at several concentrations of the copolymer in cyclohexanone, as determined, for example, according to ASTM D1243–60, Method A, but at 25°C. Instrinsic viscosity can be converted to molecular weight in accordance with the procedure set forth in the *Journal of Polymer Science*, Vol. 23, pp. 887 (1957). The amount of ethylene in the copolymers is determined from chlorine analysis and correlated with volume percent ethylene as determined by measurements of specific gravity (ASTM D792–60T). The formulation used for determining PMI is 100 parts by weight of copolymer, 2.5 parts of liquid barium-cadmium organic stabilizer per 100 parts of copolymer and 0.5 parts of stearic acid per 100 parts of copolymer. The 100% tensile modulus is determined according to ASTM D 412–68 Die C and is the tensile stress at 100% elongation. The formulation used for determining $T_f$ and $T_4$ includes 100 parts of copolymer and 3 parts of di-n-butyl tin-beta-mercapto propionate per 100 parts of copolymer. ASTM D 1043–69 is employed for $T_f$ and $T_4$ determinations where $T_f$ is the temperature at which the plastic has an apparent modulus of elasticity of 135,000 psi, and $T_4$ is the temperature where the modulus is 10,000 psi.

The novel vinyl chloride-ethylene copolymers of this invention can be formed by conventional copolymerization processes. Catalysts for such copolymerization are well known and include the more active catalysts, such as tertiary butylperoxypivalate, while less active catalysts, such as lauroyl peroxide can be used. The most suitable process for preparing the vinyl chloride-ethylene copolymers of the present invention is essentially that of suspension polymerization wherein the monomers are copolymerized in an aqueous system, under constant agitation, in the presence of appropriate suspending and surface active agents. However, other processes known to the art, such as emulsion, solution, and mass polymerization, can be employed to prepare the copolymers.

Various suspending agents, such as those which have been disclosed for use in the suspension polymerization of vinyl chloride can be employed. Examples of such of these suspending agents include polyvinyl alcohol, methyl cellulose, gelatin, magnesium carbonate, guar gum, silica, magnesium lauryl sulfate, and magnesium silicate. When polyvinyl alcohol is used as a suspending agent, it is preferred to use partially hydrolyzed polyvinyl alcohol, e.g., polyvinyl alcohol having a percent hydrolysis of 80 to 90, rather than fully hydrolyzed polyvinyl alcohol.

Suitable as catalysts are the organic peroxides, such as lauroyl peroxide, tertiary butyl peroxypivalate, diisopropyl peroxydicarbonate, 2,4-dichlorobenzoyl peroxide, and benzoyl peroxide, the inorganic peroxides, such as potassium persulfate or the azo-nitrile catalysts such as azo-bis-isobutyronitrile. Also suitable are the well known redox catalyst systems described, for example in "Fundamental Principles of Polymerization" by G. F. D'Alelio (published by John Wiley & Sons, Inc., New York, 1952), pages 333 et seq. Also suitable is the use of water soluble promoters such as sodium bisulfite, in combination with an oil soluble free radical catalyst.

The quantity of suspending agent can vary widely, but most suitably it is present in an amount of between about 0.01% and about 0.5% by weight based upon the total quantity of monomers in the aqueous system, and preferably about 0.05% and about 0.2% by weight, Similarly, the quantity of catalyst can vary, but best results are obtained when the catalyst is present in an amount between about 0.01% and about 10% by weight based on the monomers, and most preferably in an amount between about 0.1% and about 1.0% by weight.

The aqueous suspension copolymerization system also can advantageously include a wetting agent in the amount of between about 0.001% to about 1% by weight of the monomers and preferably between about 0.005% and about 0.05% by weight. Any of the many wetting agents used in suspension polymerization systems can be employed, but most preferably the wetting agent is sodium di-octyl sulfosuccinate.

In order to maintain the pH of the suspension system within a range of about 3 to about 11, there is suitably added an alkaline buffering agent of any convenient type. Any alkaline material which is compatible with polyvinyl alcohol can be used as the buffer. The amount of buffer is that sufficient to adjust the pH of the suspension within the above-specified range. A preferred buffer is sodium bicarbonate because of its compatibility with polyvinyl alcohol and its low cost. The amount of sodium bicarbonate used as a buffer is generally between about 0.01% and about 0.5% by weight, based on the monomers. Other buffers such as disodium phosphate, sodium acetate, and the like can be used. When superior electrical properties are desired in the product, a non-metallic buffer such as ammonium bicarbonate is preferred.

The amount of water used is that which is sufficient to accommodate the various components of the system and to support the resultant copolymer in suspension in conventional manner. Thus, ordinarily the ratio of water to total monomer is from about 1 to 1 up to about 4 to 1.

In carrying out the polymerization operation, a solution of the suspending agent and wetting agent is normally first prepared. This is effected by dissolving the wetting agent in sufficient water to form a solution, followed by the portionwise addition of the suspending agent, while stirring the solution vigorously. Although it is not necessary to do so, the foregoing steps are suitably carried out with the water at a slightly elevated temperature, e.g., 75°C, and after the solution has been formed, it is allowed to cool to room temperature. The foregoing solution is then diluted with enough water to form the desired volume to be charged to the polymerization vessel, and the buffering agent is dissolved in the solution.

The solution is then, in the case of batch polymerization, charged to a suitable polymerization vessel, such as an autoclave constructed to withstand pressures of up to about 1,000 pounds per square inch and the catalyst is added to the solution. The autoclave is sealed and flushed successively with nitrogen and then with vinyl chloride in vapor form. Agitation of the reactor contents is begun and the vinyl chloride monomer and the ethylene monomer are introduced, the vinyl chloride monomer being introduced as a liquid and the ethylene monomer being introduced in gaseous form. The polymerization system is then brought to the reaction temperature, e.g., about 50°C with constant agitation, and reaction is continued until the desired copolymerization is achieved. The time of reaction will, of course, vary, depending upon the size of the apparatus and the volumes of the reactants employed, but ordinarily, reaction times of about ten hours are generally sufficient.

The ethylene monomer, being in gaseous form, is most suitably metered by weighing or by the so-called "pressure drop" method, i.e., a previous calibration by means of a flow meter determines the pressure drop equivalent to a known volume of gas. The vinyl chloride can be added entirely at the beginning of the reaction, but it can also be added stepwise or intermittently during the course of the reaction, the rate of addition of the liquid monomer being controlled so that there is always free vinyl chloride monomer present in the reaction vessel. This can be readily determined by sampling or by other conventional means. The ratio between the ethylene monomer and the vinyl chloride monomer is selected to provide a copolymer having the above specified content of ethylene. In general, in carrying out the polymerization method described, the ratios between the ethylene and the vinyl chloride charged are such that the ethylene is present usually in at least 100% excess in relation to the ratios of the two monomers in the finished copolymer, polymerization being continued until most of the vinyl chloride charge has reacted, e.g., at least about 85 to about 95%.

The above described vinyl chloride-ethylene copolymer resins can contain minor amounts of conventional additives such as stabilizers, lubricants, fillers, pigments, etc. Conventional compounding agents of these types are well known in the polymer art. For example, suitable stabilizers include the well known alkyl tin thioglycollate, di-octyl tin dilaurate, basic lead carbonate, metal phenates such as lead or tin phenate, and barium, n-nonylphenate, fatty acid soaps of lead, cadmium, barium, calcium and magnesium, cadmium benzoate, triphenylphosphite, mono-octyl diphenylphosphite, di(epoxyethyl)benzene, epoxidized fatty oils and the like, alone or in combination. The function of such stabilizers in polymers is well known and is described, for example, in "Polymer Processes" by Schildknecht, at pages 542 to 546.

In like manner, conventional lubricants, such as mineral oil, fatty acids, synthetic waxes of the fatty amide and ester types, octyl stearate and calcium stearate, are used. Polymer lubricants are referred to in "Polymer Processes" by Schildknecht, at pages 685 et seq. Stabilizers and lubricants are used in varying quantities from about 0.1 to about 10% by weight, such as described in the foregoing publication, depending upon the nature of the individual agent. Generally, however, stabilizers are used in an amount between about 0.5% and about 5% by weight of the copolymer, provided the use of a small amount is sufficient to effect the desired stabilization. The same considerations apply to the use of lubricants. In general, lubricants are used in an amount ranging between about 0.1% and about 1% by weight or more of the copolymer.

Any and all pigments commonly employed in connection with vinyl chloride polymer compositions can be used, such as carbon black, titanium dioxide, phthalocyanines, and the like, depending upon the color, if any, desired in the final product. Conventional amounts of pigments can be added.

Either fibrous or non-fibrous fillers can be employed in preparing resinous compositions comprising the novel vinyl chloride-ethylene copolymers of this invention. Fibrous fillers that can be used include asbestos, glass fibers, cotton, rayon, nylon and the mineral wools. Asbestos is the most commonly used fibrous filler. The useful non-fibrous and organic fillers include the many materials that are commonly employed as fillers in the plastic industry, such as calcium carbonate, calcium sulfate, calcium silicate, barium carbonate, barium sulfate, silica, china clay, kaolin, fuller's earth, and magnesium silicate, as well as such pigments as titanium dioxide, lead chromate, and iron oxide. The fibrous fillers can suitably be used in amounts up to approximately 200 parts and the non-fibrous fillers in amounts up to approximately 300 parts by weight per 100 parts by weight of the vinyl chloride-ethylene copolymer resin.

As previously indicated, between about 15 and about 40 weight percent of one or more compatible plasticizers are employed in accordance with the present invention. Specific plasticizers include acylic esters, cyclic esters, dialkyl phthalates, dialkyl alkanedicarboxylates, aryl and alkyl phosphates, etc. Thus, plasticizers which can be used in accordance with the present invention include di-(2-ethylhexyl) phthalate, di-(2-ethylhexyl) adipate, di-isodecylphthalate, n-octyl n-decyl trimellitate and tricresylphosphate. Particularly preferred plasticizers, however, are the lower cost plasticizers which contain between about 20 and about 42 major atoms (the expression major atoms being defined hereinabove). Examples of such preferred plasticizers include dioctyl phthalate which contain 28 major atoms (excluding hydrogen atoms). Tricresyl phosphate contains 26 major atoms, dioctyl adipate contains 24 major atoms and dibutylphthalate contains 20 major atoms. Trinonyl trimellitate contains 42 major atoms.

In addition to the ingredients described above, other resin additives, such as extenders, solvents, binders, and the like, can be incorporated into the vinyl chloride-ethylene copolymers in amounts ordinarily employed by the vinyl chloride polymer art.

It is sometimes desirable to compound the vinyl chloride-ethylene copolymer resins of the present invention with other resinous materials which have a modifying effect upon the vinyl chloride-ethylene copolymer resins. Examples of resinous materials suitable for this purpose include polyvinylchloride, vinyl chloride-vinyl acetate copolymer and other vinyl chloride copolymers, chlorinated polyolefins, chlorinated polyvinylchlorides and chlorinated vinyl chloride copolymers, acrylonitrile-butadiene-styrene copolymers, acrylonitrile-butadiene copolymers, alkyl acrylate and methacrylate copolymers such as polymers containing ethyl acrylate and methacrylate, vinly acetate-ethylene copolymers and chlorinated paraffin waxes. Such modifying resinous materials can be used in varying amounts but ordinarily are employed in relatively minor proportions., e.g. less than the weight of the vinyl chloride-ethylene copolymer resin and preferably less than about 50% by weight of the vinyl chloride-ethylene copolymer resin. More preferably, such modifying resinous materials are used in amounts between about 10% by weight and about 25% by weight of the vinyl chloride-ethylene copolymer resin.

It was unexpected that ethylene comonomer could increase the softness of plasticized vinyl chloride products without increasing the migration of external plasticizer present. It would ordinarily be anticipated that plasticizer loss would be higher with softer samples. However, this is not the case with respect to the copolymers of this invention. At a plasticizer level at which hexane loss is essentially zero, approximately 17 parts of dioctylphthalate plasticizer per hundred parts of resin, the 100% tensile modulus for copolymer compositions of the present invention can vary from about 800 to about 3000 pounds per square inch, whereas homopolymer vinyl chloride compositions are rigid. Looking at this in another way, when formulated to equal stiffness, e.g., a 100% tensile modulus of 1,500 pounds per square inch, hexane loss after 1 hour varies from 0 to about 9% with copolymers of the present invention and is over 25% with polyvinyl chloride. This improvement in permanence has been found to be true with other plasticizers.

Thus, vinyl chloride products can be made both soft and flexible and yet have a high degree of plasticizer permanence. Comparisons can be made with polyvinyl chloride. For example, if 54 parts per 100 parts of resin of di(2-ethylhexyl) phthalate is incorporated into polyvinyl chloride, a compound is formed which is both soft and pliable and quite suitable in this respect for application as automobile upholstery. However, in time, the compound stiffens from a phenomenon known as "ruboff". Plasticizer at the surface of the compound becomes absorbed in clothing on contact and plasticizer from the center of the film migrates to the surface. If the polyvinyl chloride formulation contained a lower level of plasticizer, the loss of plasticizer would not be as fast but the resulting product would be unsuitable for any non-rigid application such as automotive upholstery. Polyvinyl chloride product formulated with only 20 to 25 parts per 100 parts of plasticizer per 100 parts of polymer would have low "ruboff" loss, but the compound which would be formed would be too stiff to be used in automotive upholstery applications.

In contrast, it has been found that a vinyl chloride-ethylene copolymer containing 82 mole percent of vinyl chloride and 18 mole percent of ethylene can be formulated with only 20 parts of di(2-ethylhexyl) phthalate per 100 parts of the copolymer to obtain a flexible material having negligible "ruboff" loss.

Upholstery compositions have also been prepared using tri(n-octyl, n-decyl) mellitate as a plasticizer for both vinyl chloride-ethylene copolymer and polyvinyl chloride. The formulations included 50 parts by weight of plasticizer for the homopolymer and 22 parts by weight of the plasticizer for the copolymer. Equal amounts of phosphite chelator (0.5 parts by weight), and solid barium/cadmium soap (3 parts by weight) were employed in the formulations. The particular plasticizer was selected because of its resistance to soapy water and low windshield fogging when employed in upholstery film compositions. Plasticizer loss after 10 days in mineral oil at 23°C amounted to 0.3 weight percent in the copolymer composition and 19 weight percent in the homopolymer composition. Thus, when formulated with the vinyl chloride-ethylene copolymers of the present invention, the tri(n-octyl, n-decyl) mellitate plasticizer provides improved gasoline and oil resistance, as well as the fogging resistance. Moreover, in the above formulations it was noted that the copolymer materials fluxed at 50°F lower than the homopolymer. This allowed faster calendering and easier processing.

It has been found that direct current resistivity is affected by the addition of plasticizer but not by the addition of ethylene comonomer in the vinyl chloride-ethylene copolymer compositions of the present invention. Typically, rigid polyvinyl chloride compounds have resistivities about $10^3$ times typical plasticized compounds (depending on particular plasticizers used). The lower plasticizer levels useful with the copolymers of the present invention result in substantially higher resistivity. For example, polyvinyl chloride in a typical wire jacket compound with 70 parts of bis (tridecyl) phthalate per hundred parts of homopolymer had a direct current volume resistivity at 70°C of $10^{11}$ ohm centimeters. Copolymer containing 20 mole % ethylene formulated to the same tensile modulus with 32 parts of the same plasticizer per hundred parts of copolymer showed a direct current volume resistivity at 70°C of $4 \times 10^{12}$ ohm centimeters.

Another important consideration is the ever increasing trend toward an insistence on non-flammability for plastic materials. For polyvinyl chloride, it might be difficult, if not completely impractical, to impart non-flammability properties to the homopolymer for applications such as automotive upholstery. However, for the vinyl chloride-ethylene copolymers of the present invention, tricresylphosphate plasticized compositions can be used which not only add the desired degree of permanence but are non-flammable as well.

The invention will be further illustrated by the following Examples, it being understood that there is no intention to be necessarily limited by any details thereof since variations can be made within the scope of the invention. Physical characteristics of the vinyl chloride-ethylene copolymer compositions which are referred to below and which are not identified by any previously mentioned testing method, are determined by conventional standard tests. In the Examples, all parts are by weight unless otherwise indicated.

EXAMPLE I

A vinyl chloride-ethylene copolymer containing approximately 25 mole percent ethylene had a 100% tensile modulus of 1300 pounds per square inch when plasticized with 22 parts of dioctyl phthalate per hundred parts of the vinyl chloride-ethylene copolymer. Plasticizer migration for the vinyl chloride-ethylene copolymer composition was compared with plasticized polyvinyl chloride compositions, having 100% tensile moduli of 1500 and 1700 psi. All compositions were stabilized with 2.5 phr liquid barium-cadmium organic stabilizer and 0.5 phr stearic acid. The results of the tests are set forth below:

| Plasticizer | Copolymer | Homopolymer | |
|---|---|---|---|
| Dioctyl phthalate, phr | 22 | 54 | — |
| Glycol-adipate polyester (200 major atoms) of about 3300 molecular weight, a viscosity at 25°C of 53 poises, and a specific gravity at 25°C of 1.08, phr | — | — | 65 |
| Plasticizer Loss, % | | | |
| Hexane, 23°C, 1 hour | 0.1 | 28 | 1.3 |
| Mineral oil, 23°C, 1 day | 0.07 | 2.5 | 0.6 |
| Mineral Oil, 23°C, 10 days | 0.27 | 7.5 | 2.2 |
| Soapy water, 90°C, 1 hour | 0.8 | 1.6 | 1.8 |
| Carbon Volatility, 70°C, 24 hours | 0.8 | 2.0 | 0.8 |

At 22 phr dioctyl phthalate, the copolymer composition had a lower 100% tensile modulus, and a lower dioctyl phthalate concentration should have been used in the copolymer composition. Thus, even when overplasticized, the vinyl chloride-ethylene copolymer compositions of the present invention resulted in superior permanence properties, even when compared to a polyvinyl chloride composition containing the expensive polymer plasticizer.

EXAMPLE II

Plasticizer migration to plastic surfaces was tested by running styrene and nitrocellulose lacquer marring tests in connection with a vinyl chloride-ethylene copolymer containing 24 mole percent ethylene. Polyvinyl chloride was employed for comparison purposes. The compound formulations are listed below:

| Compound Additives, PHR | Copolymer | Homopolymer |
|---|---|---|
| Dioctylphthalate | 45 | 75 |
| Epoxidized linseed oil | 3.0 | 3.0 |
| dibutyl-tin-bis (octyl-thioglycollate) | 2.5 | 2.5 |
| Calcium carbonate | 80 | 80 |

Migration to polystyrene was observed after 48 hours at 70°C under one pound per square inch of force. For the copolymer, very slight migration was noted whereas for the homopolymer migration was severe. Migration to nitrocellulose lacquer was observed after 14 days at 23°C under one pound per square inch of force. No migration was noted for the copolymer whereas severe migration was noted for the homopolymer At 45 phr DOP, the copolymer composition was softer (Shore A Durometer, ASTM D 1706: 66 vs. 75) and had a lower 100% tensile modulus (700 vs. 1070 psi), and a lower DOP concentration should have been used in the copolymer composition. Thus, even when over-plasticized, the vinyl chloride-ethylene copolymer compositions of the present invention resulted in superior migration characteristics when placed in contact with plastic surfaces.

When the same vinyl chloride copolymer and homopolymer were plasticized with the more expensive high molecular weight n-octyl-n-decyl-trimellitate plasticizer and the level of 45 parts of plasticizer per hundred parts of copolymer and 75 parts of plasticizer per hundred parts of homopolymer were employed with otherwise identical formulations, migration to plastic surfaces was at least as good for the copolymer as for the homopolymer. In fact, the copolymer performed slightly better with respect to migration to polystyrene, even though it was overplasticized (71 vs. 80 hardness and 910 vs. 1300 psi 100% tensile modulus).

The migration tests set forth above indicate that a potential cost saving can be derived using lower cost plasticizers such as dioctyl phthalate in place of the higher molecular weight plasticizers such as the trimellitates. The importance of these facts is apparent when one considers the problems which have existed involving a migration of the plasticizers from the vinyl material of refrigerator door gaskets to an adjacent solid surface such as the polystyrene component of a refrigerator door or from a telephone wire to a lacquered table top.

EXAMPLE III

This Example sets forth a comparison between the plasticizer migration characteristics of a vinyl chloride-ethylene copolymer of the prior art containing an amount of ethylene substantially below the minimum amount of ethylene required in the compositions of the present invention and the plasticizer migration characteristics of the compositions of this invention.

A vinyl chloride-ethylene copolymer containing 10 mole % ethylene was prepared following the general procedure set forth in Example 6 of Kamio et al., U.S. Pat. No. 3,501,440, in which 406 ml. of distilled water, 0.153 g. of methyl cellulose as a suspending agent, 0.03 g. of sodium dioctyl sulfosuccinate as the wetting agent, and 0.614 g. of lauryl peroxide as the initiator were placed in a reactor. The reactor was flushed with oxygen-free nitrogen, and ethylene and 150 g. of monomeric vinyl chloride were fed into the reactor. The reaction temperature was maintained at 59°C for 8 hours, while maintaining the ethylene pressure at 34.2 kg./cm$^2$ by removing excess ethylene. The yield was 140.8 grams of a homogeneous vinyl chloride-ethylene copolymer having an average intrinsic viscosity (IV) of 0.81 dl/g., an ethylene content of 10 mole % (approximately 5 wt. %), a chlorine content of 51.4 ± 0.1 wt. %.

Vinyl chloride-ethylene copolymers having approximately 12.5 and 14.6 mole % were prepared in accordance with the general procedure set forth above, except for the modifications noted in Table I below.

As a control, vinyl chloride-ethylene copolymer containing approximately 6 mole % (about 2.8 wt. %) was prepared following the exact procedures set forth in Example 1 of the Kamio et al. reference, in which 450 ml. of distilled water, 0.3 g. of polyvinyl alcohol and 0.3 g. of lauryl peroxide were placed in a 700 ml. stainless steel autoclave. The vessel was flushed with oxygen-free nitrogen and 150 g. of monomeric vinyl chloride were fed and ethylene was introduced into the vessel. The reaction temperature was maintained at 60°C for 5 ½ hours, while maintaining the ethylene pressure at 10 kg./cm² by removing excess ethylene. The yield was 75.4 grams of homogeneous vinyl chloride-ethylene copolymer having an average IV of 0.776, an ethylene content of 2.9 wt. % and a chlorine content of 55.1 ± 0.1 wt. %. A duplicate run was carried out in order to obtain sufficient quantity of the prior art copolymer in order to carry out the comparative tests of this Example to yield 49.8 g. of a homogeneous vinyl chloride-ethylene copolymer having an IV of 0.783, an ethylene content of 2.6 wt. % and a chlorine content of 55.2 ± 0.1 wt. %. The vinyl chloride-ethylene copolymer obtained from each of the duplicate runs was combined into one sample having an average ethylene content of approximately 6 mole %.

One hundred parts by weight of each of the vinyl chloride-ethylene copolymers of Runs 1 – 3 of Table I and the combined vinyl chloride-ethylene copolymer of the prior art runs A and B were compounded with three parts of a mixed stabilizer of metal soaps sold under the trademark Mark XI (a mixture of cadmium laurate and barium laurate), an amount of dioctyl phthalate as set forth in Table II below and 0.7 part of stearic acid as a lubricant. Each of the compounded materials were rolled by means of two rolls (6 inch diameter by 12 inch diameter) to form films of the size set forth in notes of Table II below.

The resulting film samples were each analyzed for hardness and for % wt. loss in hexane and the results are set forth below:

TABLE I

| | Polymerization Runs of the Prior Art | | Polymerization Runs of This Invention | | |
|---|---|---|---|---|---|
| | A | B | 1 | 2 | 3 |
| Reactor charge parts by weight | | | | | |
| Water | 450 | 450 | 406 | 637 | 637 |
| Suspending agent | 0.3[1] | 0.3[1] | 0.153[2] | 0.222[2] | 0.222[2] |
| Wetting Agent | 0 | 0 | 0.03[3] | 0.03[3] | 0.03[3] |
| Buffer | 0 | 0 | 0 | 0.12[4] | 0.12[4] |
| Catalyst | 0.3[5] | 0.3[5] | 0.614[5] | 0.682[6] | 0.682[6] |
| Vinyl Chloride | 150 | 150 | 150 | 150 | 150 |
| Reaction Conditions | | | | | |
| Max. ethylene pressure at reaction temp.,Kg/cm² | 10 | 10 | 34.2 | 45.8 | 45.8 |
| Temperature,°C | 60 | 60 | 59 | 53 | 40 |
| Time of reaction, hours | 5.5 | 5.5 | 8 | 6.5 | 7 |
| Product | | | | | |
| Yield, parts by weight | 75.4 | 49.8 | 140.8 | 130.4 | 130.4 |
| IV, dl/g. | 0.776 | 0.783 | 0.81 | 0.81 | 0.93 |
| Chlorine, % by wt. ± 0.1% | 55.1 | 55.2 | 51.4 | 53.3 | 52.7 |
| Ethylene, mol, % | 6.2 | 5.6 | 10 | 12.5 | 14.6 |

Notes:
[1] Polyvinyl alcohol
[2] Methyl cellulose
[3] Sodium Dioctyl Sulfosuccinate
[4] Sodium bicarbonate
[5] Lauroyl peroxide
[6] t-butyl peroxyneodecanoate

TABLE II

| | Prior Art Film Samples | | Film Samples Of This Invention | | | |
|---|---|---|---|---|---|---|
| | | | 4 | 5 | 6 | 7 |
| Copolymer Run | A & B | A & B | 1 | 1 | 1 | 1 |
| Mol. % Ethylene | 6 | 6 | 10 | 10 | 10 | 10 |
| DOP Plasticizer | | | | | | |
| Wt. % | 23.1 | 23.1 | 23.1 | 20 | 20 | 15 |
| Parts per Hundred | 30 | 30 | 30 | 25 | 25 | 17.6 |
| Results | | | | | | |
| Shore D Durometer Hardness, 10 seconds | 41[1] | 41[2] | 39[2] | 51[2] | 51[1] | 71[1] |
| % Wt. loss in Hexane | | | | | | |
| 1 hour | 7.9[1],[3] | 9.6[2],[4] | 2.2[2],[4] | 0.5[2],[4] | 0.3[1],[3] | 0.07[1],[3] |
| 24 hours | 11.5[1],[5] | 11.5[2],[6] | N. A.[8] | N. A.[8] | 3.7[1],[5] | 0[1],[5] |
| Loss of Plasticizer after 1 hour Wt. %[9] | 34.2 | 41.6 | 9.5 | 2.5 | 1.5 | 0.47 |
| | 8 | | 9 | 10 | 11 | 12 |
| Copolymer Run | 2 | | 2 | 2 | 2 | 2 |
| Mol. % Ethylene | 12.5 | | 12.5 | 12.5 | 12.5 | 12.5 |
| DOP Plasticizer | | | | | | |
| Wt. % | 23.1 | | 20 | 20 | 17.5 | 15 |
| Parts per Hundred | 30 | | 25 | 25 | 21.2 | 17.6 |
| Results | | | | | | |
| Shore D Durometer Hardness, 10 seconds | 25.5[1] | | 35[1] | 35[2] | 44[1] | 52[1] |
| % Wt. Loss in Hexane | | | | | | |
| 1 hour | 1.1[1],[4] | | 0.7(1),(3) | 0.8[2],[4] | 0.08[1],[3] | 0.01[1],[3] |
| 24 hours | 10.6[1],[6],[7] | | 0.9[1],[5] | N. A.[8] | 0.3[2],[5] | 0.1[4],[5] |
| Loss of plasticizer after 1 hour Wt. %[9] | 4.7 | | 3.5 | 4.0 | 0.46 | 0.07 |
| | 13 | | 14 | 15 | | |
| Copolymer Run | 3 | | 3 | 3 | | |
| Mol. % Ethylene | 14.6 | | 14.6 | 14.6 | | |
| DOP Plasticizer | | | | | | |
| Wt. % | 23.1 | | 20 | 15 | | |
| Parts per Hundred | 30 | | 25 | 17.6 | | |
| Results | | | | | | |
| Shore D Durometer Hardness, 10 seconds | 23.5[1] | | 34[1] | 44[1] | | |
| % wt. Loss in Hexane | | | | | | |
| 1 hour | 1.0[1],[4] | | 0.9[1],[4] | 0.09[1],[4] | | |
| 24 hours | 10.9[1],[6],[7] | | 1.5[1],[5] | 0.3[2],[6] | | |
| Loss of plasticizer after 1 hour Wt. %[9] | 4.3 | | 4.5 | 0.6 | | |

NOTES FOR TABLE II:
[1] Result based on an average of results of 3 separate film samples.
[2]
[3] Film Thickness of each sample tested was 8 ± 3 mils.
[4] Film Thickness of each sample tested was 6 ± 1 mils.
[5] Film Thickness of each sample tested was 10 ± 5 mils.
[6] Film Thickness of each sample tested was 9 ± 4 mils.
[7] 24 hour test result is not significant because soft film samples, i.e. having Shore D Hardness under 30, swell excessively during test.
[8] Result not available.
[9] Based on the assumption that all of the losses after 1 hour in hexane at 23°C are due to DOP.

Table II illustrates the difference between the samples of film of the composition of this invention and the samples of film of the prior art composition. When one compares the 1 hour weight loss values of film sample 4 versus either of the values of Prior Art film samples at the same DOP loading, one notes that even at the minimum level of 10 mol. % ethylene, the composition of the present invention has over 3 times the plasticizer permanence of the prior art composition. In fact, if one compares the 1 hour weight loss data of the average of the 2 film samples having the same DOP loading and the same film thickness of 6 ± 1 mils, one notes that the plasticizer permanence of the composition of this invention is over 4 times that of the prior art composition.

As one increases the ethylene content of the vinyl chloride-ethylene copolymer from this minimum level, the magnitude of the improvement in plasticizer permanence becomes even more significant. On comparing the 1 hour weight loss data of the average of 2 film samples having the same DOP loading and the same thickness of 6 ± 1 mils, one notes that the plasticizer permanence of the compositions of this invention having 12.5 and 14.6 mol. % ethylene, i.e. film samples 8 and 13, are over 8 and 9 times, respectively, that of the prior art composition.

It is known that the diffusion of plasticizers in polymers takes place more readily as the polymer becomes softer, thus, the comparison between the data of any given film sample and the prior art sample should be made on the same relative level of hardness as measured by the Shore D method. Therefore, the comparison between film samples 8 and 9 and the prior art should actually be based on an extrapolated value of 0.3 wt. % loss after 1 hour in hexane based on an equal hardness of 41 or over 30 times greater plasticizer permanence than that of the prior art composition.

From the foregoing, it will be seen that this invention is well adapted to obtain all of the ends and objects hereinabove set forth together with other advantages which are obvious and which are inherent to the system. The problem of plasticizer migration is substantially eliminated in vinyl chloride-ethylene copolymer compositions. This chemical and dimensional stability of the copolymer composition is obtained at relatively low cost. In particular, low cost plasticizers containing between about 20 and about 42 major atoms can be employed as external plasticizers for the flexible vinyl chloride-ethylene copolymers of the present invention. Thus, in accordance with the present invention it is possible to formulate vinyl plastic using relatively simple monomeric plasticizers and yet develop a degree of permanence which is usually associated with the use of more complex, expensive plasticizers.

The flexible vinyl chloride-ethylene copolymer compositions which are prepared in accordance with the invention can be utilized in a variety of applications including the preparation of floor tiles, records, film materials (including shower curtains), plastic bags, upholstery covering, gasket material and high temperature wire insulation. It will also be apparent that when compounded with modifying resins a wide variety of other applications become possible.

Obviously, many other modifications and variations of the invention hereinabove set forth can be made without departing from the spirit and scope thereof.

I claim:

1. A flexible, vinyl chloride-ethylene copolymer composition having a high degree of plasticizer permanence, permanent modulus index of less than about 3,000 pounds per square inch and a modulus of elasticity of less than 10,000 pounds per square inch at 23°C consisting essentially of:
   a. between about 70 and about 85 weight percent of a vinyl chloride-ethylene copolymer having an ethylene content of between about 10 and about 40 mol percent, an intrinsic viscosity of between about 0.5 and 1.5 dl/g., a permanent modulus index of less than about 3,000 pounds per square inch at 23°C and a $T_4$ value above about 25°C, said permanent modulus index being defined as the 100% tensile modulus of a composition when containing 17 parts per hundred parts of copolymer of dioctyl phthalate plasticizer, and
   b. between about 15 and about 30 weight percent of a monomeric plasticizer selected from the group consisting of dialkyl phthalates, dialkyl alkanedicarboxylates, aryl and alkyl phosphates, said plasticizer containing between about 24 and about 35 major atoms selected from the group consisting of carbon, oxygen and phosphorus.

2. A flexible, vinyl chloride-ethylene copolymer composition having a high degree of plasticizer permanence, permanent modulus index of less than about 3,000 pounds per square inch and a modulus of elasticity of less than 10,000 pounds per square inch at 23°C consisting essentially of:
   a. between about 70 and about 85 weight percent of a vinyl chloride-ethylene copolymer having an ethylene content of between about 15 and about 30 mol percent, an intrinsic viscosity of between about 0.9 and 1.3 dl/g., a permanent modulus index of less than about 2,500 pounds per square inch at 23°C and a $T_4$ value above about 40°C, said permanent modulus index being defined as the 100% tensile modulus of a composition containing 17 parts per hundred parts of copolymer of dioctyl phthalate plasticizer, and
   b. between about 15 and about 30 weight percent of a monomeric plasticizer selected from the group consisting of dialkyl phthalates, dialkyl alkanedicarboxylates, aryl and alkyl phosphates, said plasticizer having between about 24 and about 35 major atoms selected from the group consisting of carbon, oxygen and phosphorus.

3. A flexible vinyl chloride/ethylene copolymer composition having a high degree of plasticizer permanence, a permanent modulus index of less than about 3,000 pounds per square inch and a modulus of elasticity of less than 10,000 pounds per square inch at 23°C consisting essentially of:
   a. between about 80 and about 85 weight percent of a vinyl chloride/ethylene copolymer having an ethylene content of between about 15 and about 30 mol percent, an intrinsic viscosity of between about 0.9 and 1.3 dl/g., a permanent modulus index of less than about 2,500 pounds per square inch at 23°C, and a $T_4$ value above about 40°C, said permanent modulus index being defined as the 100% tensile modulus of a composition containing 17 parts per hundred parts of copolymer of dioctyl phthalate plasticizer, and
   b. between about 15 and about 20 weight percent of a monomeric plasticizer selected from the group consisting of dioctyl phthalate, di-(2-ethylhexyl) phthalate, di-(2-ethylhexyl) adipate, dioctyl adipate, tricresyl phosphate and di-isodecylphthalate.

4. A shaped article formed from a resinous composition having a high degree of plasticizer permanence, permanent modulus index of less than about 3,000 pounds per square inch and a modulus of elasticity of less than 10,000 pounds per square inch at 23°C consisting essentially of:
   a. between about 70 and about 85 weight percent of a vinyl chloride-ethylene copolymer having an ethylene content of between about 10 and about 40 mol percent, an intrinsic viscosity of between about 0.5 and about 1.5 dl/g., a permanent modulus index of less than about 3,000 pounds per square inch at 23°C and a $T_4$ value above about 25°C, said permanent modulus index being defined as the 100% tensile modulus of a composition when containing 17 parts per hundred parts of copolymer of dioctyl phthalate plasticizer, and
   b. between about 15 and about 30 weight percent of a monomeric plasticizer selected from the group consisting of dialkyl phthalates, dialkyl alkanedicarboxylates, aryl and alkyl phosphates, said plasticizer containing between about 24 and about 35 major atoms selected from the group consisting of carbon, oxygen and phosphorus, said composition also containing from about 0.1 to 10% by weight of a stabilizer and a lubricant.

* * * * *